(12) United States Patent
Sugaya

(10) Patent No.: US 11,438,515 B2
(45) Date of Patent: Sep. 6, 2022

(54) IMAGE CAPTURING APPARATUS, METHOD OF CONTROLLING SAME, AND STORAGE MEDIUM FOR REDUCING A CODE AMOUNT

(71) Applicant: CANON KABUSHIKI KAISHA, Tokyo (JP)

(72) Inventor: Atsuto Sugaya, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 142 days.

(21) Appl. No.: 16/778,388

(22) Filed: Jan. 31, 2020

(65) Prior Publication Data

US 2020/0267298 A1 Aug. 20, 2020

(30) Foreign Application Priority Data

Feb. 19, 2019 (JP) .............................. JP2019-027652

(51) Int. Cl.
*H04N 5/225* (2006.01)
*H04N 5/235* (2006.01)

(52) U.S. Cl.
CPC ......... *H04N 5/2352* (2013.01); *H04N 5/2351* (2013.01)

(58) Field of Classification Search
CPC ............................ H04N 5/2352; H04N 5/2351
USPC ...................................................... 348/216.1
See application file for complete search history.

(56) References Cited

U.S. PATENT DOCUMENTS

| 2004/0036703 A1* | 2/2004 | Aoki ......................... G09G 5/10 |
| | | 345/690 |
| 2011/0317030 A1* | 12/2011 | Ohbuchi ............ H04N 5/23219 |
| | | 348/E5.037 |
| 2015/0022691 A1* | 1/2015 | Matsunaga ........ H04N 9/04557 |
| | | 348/231.6 |
| 2015/0281476 A1* | 10/2015 | Watanabe .............. H04N 1/387 |
| | | 348/207.1 |

FOREIGN PATENT DOCUMENTS

JP 2017135554 A 8/2017

* cited by examiner

*Primary Examiner* — Usman A Khan
(74) *Attorney, Agent, or Firm* — Carter, DeLuca & Farrell LLP

(57) ABSTRACT

The image capturing apparatus includes an image capturing unit for capturing a subject image, a calculating unit for calculating an exposure amount at a time of capturing by the image capturing unit, a range correction unit for performing range correction for compressing a range of luminance in an image signal captured by the image capturing unit, an identification unit for identifying a luminance change amount of an image signal caused by range correction, and a changing unit for, based on the luminance change amount identified by the identification unit, changing at least one of the exposure amount and a reference luminance value in an input/output characteristic in a case of performing the range correction.

10 Claims, 5 Drawing Sheets

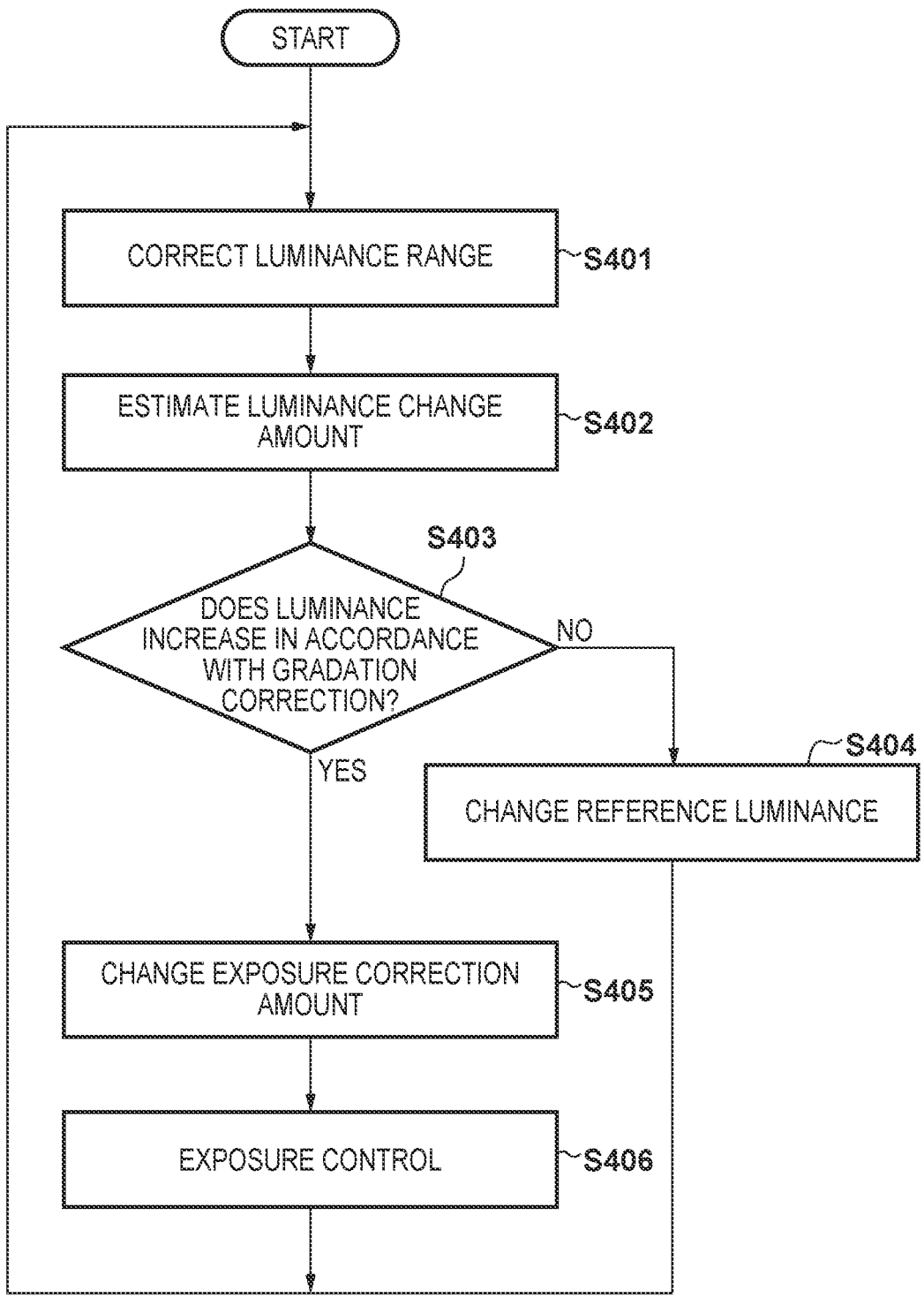

IMAGE CAPTURING APPARATUS, METHOD OF CONTROLLING SAME, AND STORAGE MEDIUM FOR REDUCING A CODE AMOUNT

BACKGROUND OF THE INVENTION

Field of the Invention

The present invention relates to an image capturing apparatus capable of reducing a code amount.

Description of the Related Art

When image capturing is performed by a camera in a low-illuminance environment, processing for increasing the gain of an image by Automatic Gain Control (AGC) is commonly performed. However, in this case, although the luminance of the image is increased, noise is increased, resulting in an image having a large code amount. In a surveillance camera requiring capturing and recording over a long time, since the size of the code amount leads to an increase in operation cost, it is necessary to generate an image with high encoding efficiency.

Japanese Patent Laid-Open No. 2017-135554 discloses a technique for detecting illuminance at a time of capturing an image and correcting at least one of a minimum output luminance and a maximum output luminance of a correction characteristic for correcting a gradation characteristic of the luminance of an image in accordance with the detected illuminance for the purpose of reducing the code amount.

However, in the prior art disclosed in the above-described Japanese Patent Laid-Open No. 2017-135554, since the amount of signal change for before and after the gradation correction is not considered, the image as a whole becomes darker or brighter by the correction being performed.

Because of this problem, the image after a gradation correction appears to have inappropriate exposure, and there are cases where a gradation correction cannot be performed sufficiently from the viewpoint of image quality. When the amount of noise in the image before a gradation correction is large, there are cases where a sufficient effect of reducing the code amount is not achieved even if a gradation correction is performed.

SUMMARY OF THE INVENTION

The present invention has been made in view of the above-mentioned problems, and provides an image capturing apparatus capable of reducing a code amount and suppressing a luminance change due to a gradation correction.

According to a first aspect of the present invention, there is provided an image capturing apparatus, comprising: an image capturing device configured to capture a subject image; and at least one processor or circuit configured to function as: a calculation unit configured to calculate an exposure amount at a time of capturing by the image capturing device; a range correction unit configured to perform a range correction for compressing a range of luminance in an image signal captured by the image capturing device; an identification unit configured to identify a luminance change amount of the image signal caused by the range correction; and a changing unit configured to, based on the luminance change amount identified by the identification unit, change at least one of the exposure amount and a reference luminance value in an input/output characteristic in a case of performing the range correction.

According to a second aspect of the present invention, there is provided a method for controlling an image capturing apparatus comprising an image capturing device operable to capture a subject image, the method comprising: calculating an exposure amount at a time of capturing by the image capturing device; performing a range correction for compressing a range of luminance in an image signal captured by the image capturing device; identifying a luminance change amount of the image signal caused by the range correction; and based on the identified luminance change amount, changing at least one of the exposure amount and a reference luminance value in an input/output characteristic in a case of performing the range correction.

Further features of the present invention will become apparent from the following description of exemplary embodiments with reference to the attached drawings.

BRIEF DESCRIPTION OF THE DRAWINGS

FIG. 4 is a flowchart illustrating an operation for a gradation correction in the first embodiment.

DESCRIPTION OF THE EMBODIMENTS

Figure 1:
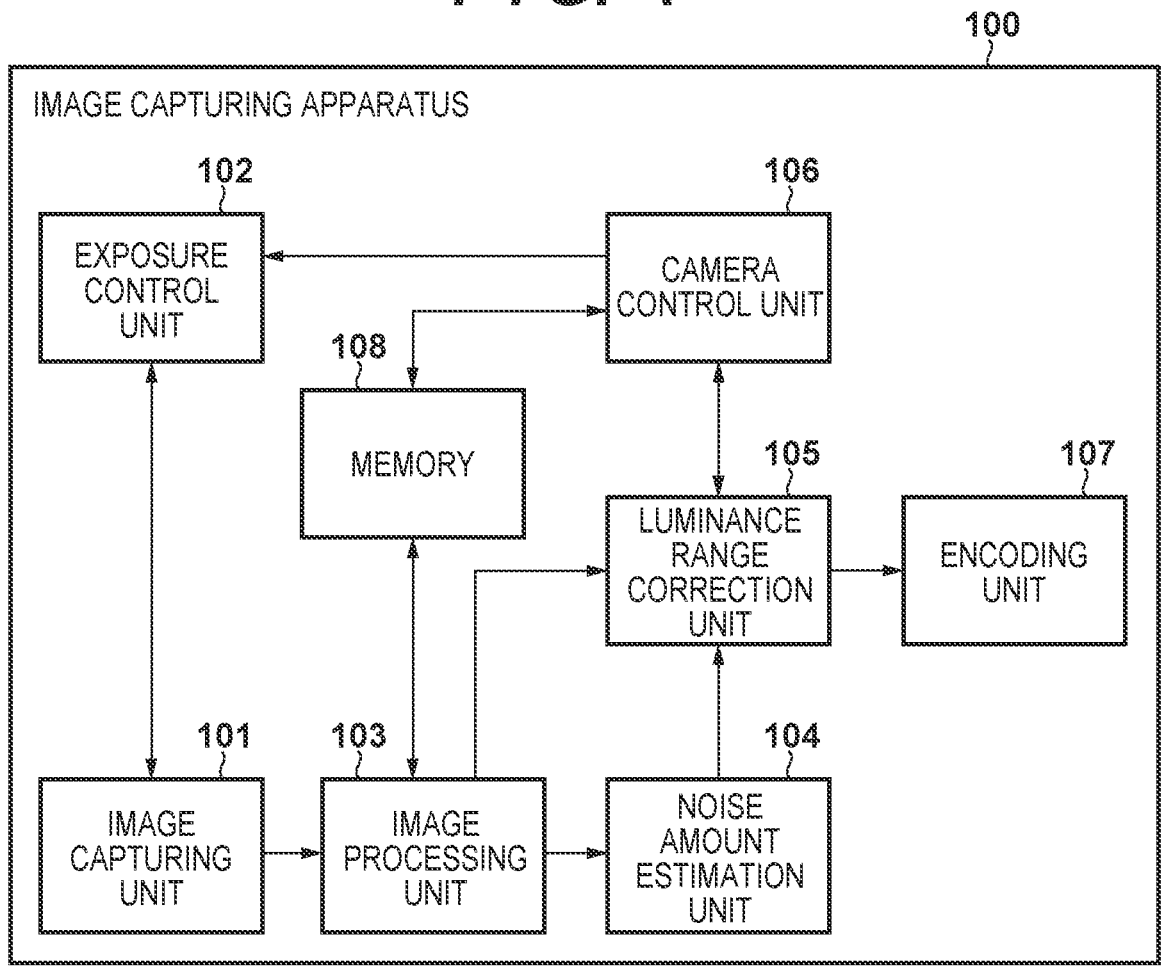
FIG. 1 is a block diagram illustrating a configuration of an image capturing apparatus according to a first embodiment of the present invention.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

FIG. 1 is a block diagram illustrating a configuration of an image capturing apparatus 100 according to a first embodiment of the present invention.

The image capturing apparatus 100 includes an image capturing unit 101, an exposure control unit 102, an image processing unit 103, a noise amount estimation unit 104, a luminance range correction unit 105, a camera control unit 106, an encoding unit 107, and a memory 108.

Figure 2:
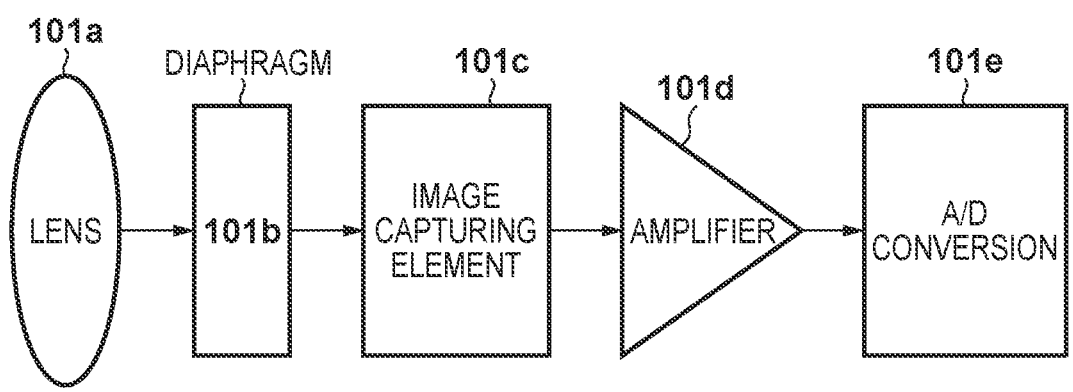
FIG. 2 is a view illustrating a configuration of an image capturing unit.

As illustrated in FIG. 2, the image capturing unit 101 includes a lens 101a, a diaphragm 101b, an image capturing element 101c, an amplifier 101d, and an A/D converter 101e.

The lens 101a is configured by several lens groups as an image capturing optical system. The diaphragm 101b is used to adjust an amount of light incident on the image capturing element 101c via the lens 101a. The image capturing element 101c includes a CCD, a CMOS sensor, or the like, and converts a subject image formed through the lens 101a into an analog image signal. The amplifier 101d performs amplification processing by a predetermined amplification factor on an electric signal output from the image capturing element 101c. The A/D converter 101e converts the analog image signal which has been subject to the amplification processing by the amplifier 101d into a digital image signal.

Based on the subject luminance calculated from the image signal output from the image capturing unit 101 and the predetermined exposure correction amount, the exposure control unit 102 controls the exposure amount by performing at least one of driving control of the diaphragm 101b, control of a charge accumulation time in the image capturing element 101c, and control of the amplification factor of the amplifier 101d. However, when the amplification factor of the amplifier 101d is increased, the image becomes brighter, but the amount of noise of the image increases, which is not desirable from a viewpoint of coding efficiency.

The image processing unit 103 generates an output image signal resulting from performing various image processing including noise reduction processing and gamma correction processing on a captured image signal obtained by the image capturing unit 101, and records a predetermined statistic relating to a luminance distribution or a luminance of the output image in the memory 108.

The noise amount estimation unit 104 estimates the noise amount of the output image from the image processing unit 103. In the present embodiment, description is given regarding a case of referring to a table indicating a relationship between a noise amount and the amplification factor of the amplifier 101d which is determined in advance according to the characteristics of the image capturing element 101c. At this time, the amount of noise is uniquely identified by the aforementioned amplification factor by referring to the table, but the amount of noise may be corrected based on an accumulation time of the charge in the image capturing element 101c and a type and intensity of image processing performed by the image processing unit 103.

Based on the noise amount estimated by the noise amount estimation unit 104, the luminance range correction unit 105 performs gradation correction on the output image of the image processing unit 103 in accordance with predetermined input/output characteristics such that a difference $\Delta YOUT$ between the maximum value and the minimum value of the output signal becomes equal to or less than a difference $\Delta YIN$ between the maximum value and the minimum value of the input signal. In the present embodiment, description is given regarding a case where the relationship between the input signal and the output signal at the time of gradation correction is expressed by the following Equation (1).

$$\text{Output signal} = \text{Input signal} \times \Delta YOUT/\Delta YIN + OFFSET \quad (1)$$

Here, $\Delta YOUT/\Delta YIN$ represents the compression ratio of the signals in the luminance range correction, and OFFSET represents a reference luminance of the entire image. At this time, the smaller difference $\Delta Y1$ (see FIG. 3A) between the maximum output value and the minimum output value of an input/output characteristic 21 expressed by Equation (1) is, the more the contrast of the image and the amount of noise decreases, and therefore the more the encoding efficiency at the time of encoding the output image is improved. Since the coding efficiency generally decreases as the amount of noise included in the image increases, the luminance range correction unit 105 performs control so that $\Delta Y1$ decreases as the amount of noise estimated by the noise amount estimation unit 103 increases.

Figure 3A:
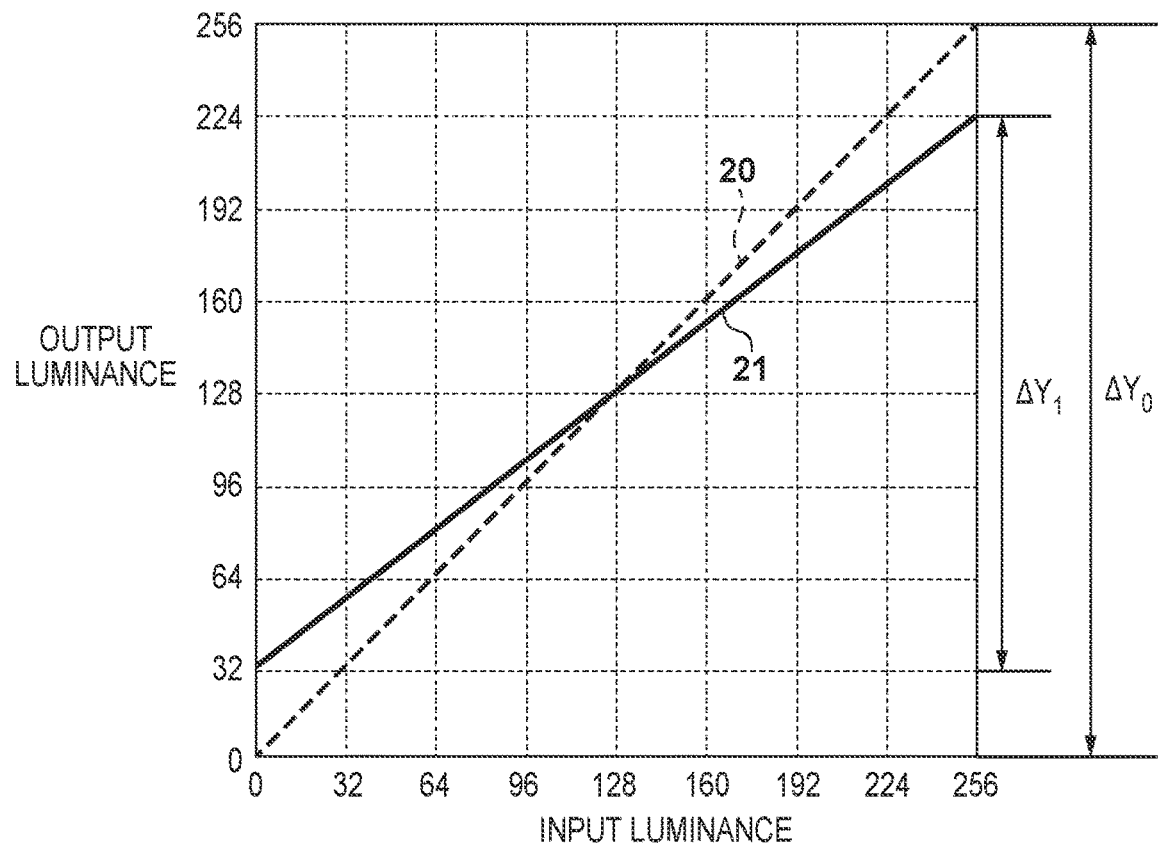
FIGS. 3A and 3B are views illustrating examples of input/output characteristics of a luminance range correction and changes in luminance distributions due to the luminance range correction.

In FIG. 3A, the input/output characteristic 21 expressed by Equation (1) is represented as input luminance on the horizontal axis and output luminance on the vertical axis. An input/output characteristic 20 is a reference input/output characteristic for when luminance range correction is not performed. $\Delta Y0$ is the difference between the maximum output value and the minimum output value of the reference input/output characteristic 20.

Figure 3B:
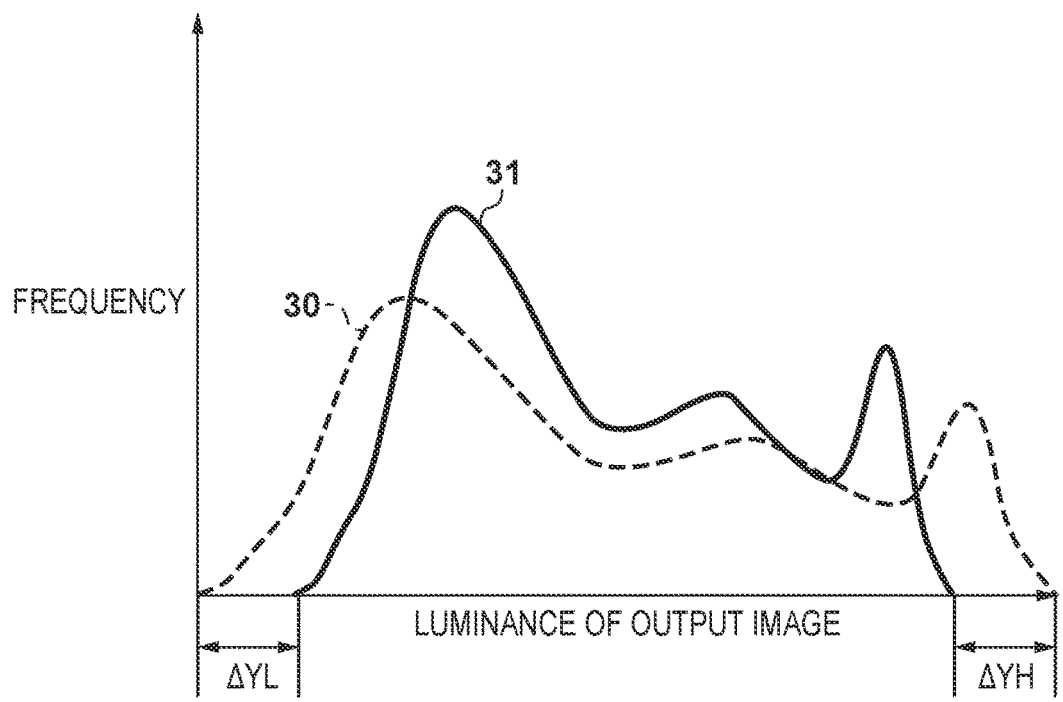

FIG. 3B is a diagram illustrating an example of a change in a luminance distribution 31 when a luminance range correction is performed with respect to a luminance distribution 30 of the image.

As illustrated in FIG. 3B, in the luminance distributions 31 of an image for which a luminance range correction has been performed, luminance regions that do not appear as luminance as illustrated by $\Delta YH$ and $\Delta YL$ in FIG. 3B are generated on at least one of the high luminance side and the low luminance side. That is, the luminance of the entire image can be controlled without changing the shape of the luminance distribution 31 (the contrast or amount of noise of the image) by varying the OFFSET value within ranges where $\Delta YH$ and $\Delta YL$ are respectively 0 or more. In addition, although input/output characteristics are expressed by straight lines in the present embodiment, even when the input/output characteristics are expressed by curves or broken lines, the luminance can be controlled by the OFFSET in a similar manner.

Further, even if the compression ratio and the reference luminance are the same, a luminance change amount caused by the luminance range correction differs depending on the luminance distribution of the image. This is because the more the input luminance is concentrated on the low luminance side of the intersection of the input/output characteristic 20 and the input/output characteristic 21, the brighter the image gets, and the more the input luminance is concentrated on the high luminance side, the darker the image gets.

The camera control unit 106 identifies the luminance change amount based on a luminance distribution or a predetermined statistic related to luminance that is recorded in the memory 108, and the luminance distribution or a predetermined statistic related to luminance of the output image of the luminance range correction unit 105. In the present embodiment, the case where the luminance average value of the entire image is used as a statistic will be described, but configuration may be taken to separately limit the region of the image in which the luminance average value is calculated, or calculate the luminance average value for a predetermined luminance range. It is also possible to adopt a statistic such as a mode value instead of an average value, or to use a combination of variances.

Based on the identified luminance change amount, the camera control unit 106 further instructs at least one of the exposure correction amount and the reference luminance to the exposure control unit 102 and the luminance range correction unit 105, and controls the luminance of the output image of the luminance range correction unit 105. The encoding unit 107 encodes an image output from the luminance range correction unit 105 by an encoding method such as MPEG or H.264, and records the encoded image on a recording medium (not illustrated).

Next, FIG. 4 is a flowchart illustrating a luminance control procedure in accordance with luminance range correction processing and exposure control processing.

In step S401, the luminance range correction unit 105 calculates the compression ratio of a signal based on a noise amount estimated by the noise amount estimation unit 104 as described above. Here, a reference luminance is determined by the camera control unit 106, but it is desirable that an initial value is set so that a residual sum of squares of images before and after the luminance range correction is minimal. Further, the more that the luminance is closer to the input luminance at the intersection of the input/output characteristic 20 and the input/output characteristic 21, the smaller the difference between the images before and after the luminance range correction becomes. Therefore, the initial value of the reference luminance may be set so that the input luminance at the intersection of the input/output characteristic 20 and the input/output characteristic 21 becomes an average value or a mode value of the luminance of the output image of the image processing unit 103.

In step S402, the camera control unit 106 calculates the difference between the luminance average value of the output image of the image processing unit 103 and the luminance average value of the output image of the luminance range correction unit 105.

In step S403, the camera control unit 106 determines whether the image becomes darker (luminance is decreased) or brighter (luminance is increased) in accordance with a luminance range correction based on the difference between the average luminance values, and proceeds to step S404 when the camera control unit 106 determines that the image becomes darker. If it is determined that the image has become brighter, the processing proceeds to step S405.

In step S404, the camera control unit 106 causes the reference luminance to increase by instructing the luminance range correction unit 105 such that the output image of the luminance range correction unit 105 becomes brighter by the difference in average luminance. Here, the exposure correction amount may be changed so that the output image of the luminance range correction unit 105 becomes brighter. However, in a case where the amplification factor increases and the noise amount increases by changing the exposure correction amount, it is preferable to increase the reference luminance.

In step S405, the camera control unit 106 causes the exposure correction amount to change by instructing the exposure control unit 102 so that the output image of the luminance range correction unit 105 becomes darker by the difference in average luminance. Here, the reference luminance may be changed so that the output image of the luminance range correction unit 105 becomes darker. However, in a case where the amplification factor decreases and the noise amount decreases by changing the reference luminance, it is preferable to change the exposure correction amount.

Further, in a case where the encoding unit 107 is employing an encoding method in which encoding is performed using correlation in the time direction of successive images, it is necessary to suppress a significant decrease in correlation in the time direction of images due to a change in the reference luminance and the exposure correction amount. Therefore, it is desirable to set a reference luminance and an exposure correction amount that can be changed in one step.

In step S406, the image capturing unit 101 is controlled to change the exposure based on the subject luminance and the exposure correction amount.

As described above, in the present embodiment, by compressing the luminance range and further decreasing the amplification factor in accordance with the luminance distribution, it is possible to improve the coding efficiency and suppress a change in the luminance of the entire image.

Second Embodiment

Figure 5:
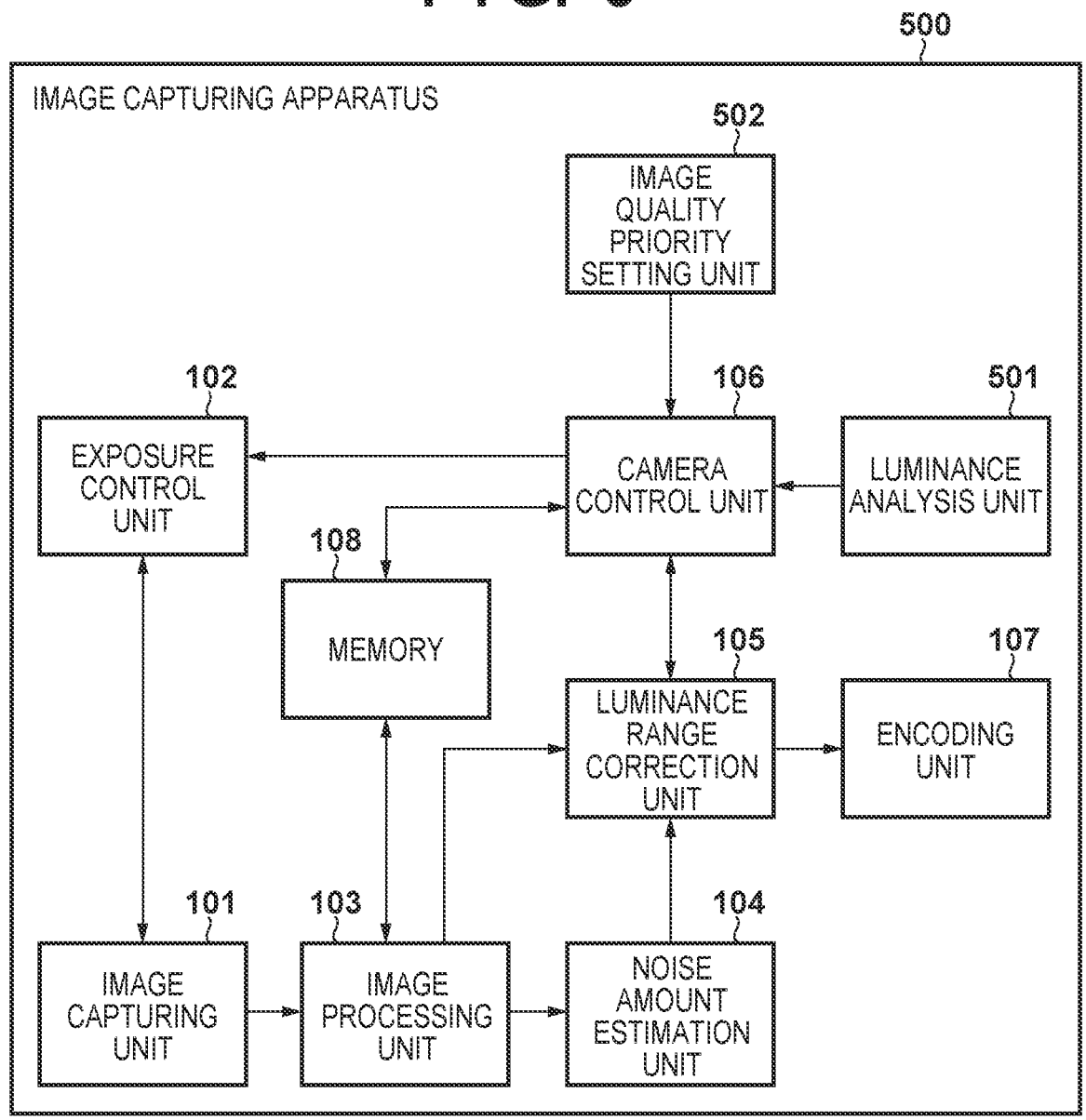
FIG. 5 is a block diagram illustrating a configuration of an image capturing apparatus according to a second embodiment.

FIG. 5 is a block diagram illustrating a configuration of an image capturing apparatus 500 according to a second embodiment of the present invention. In the image capturing apparatus 500, the same functional units as those of the image capturing apparatus 100 of the first embodiment are denoted by the same reference numerals as those of FIG. 1, and a description thereof is omitted. As illustrated in FIG. 5, the image capturing apparatus 500 of the second embodiment includes a luminance distribution analysis unit 501 and an image quality priority setting unit 502 in addition to the configuration of FIG. 1.

The luminance distribution analysis unit 501, with respect to the luminance distribution of the output image of the image processing unit 103 and based on a predetermined threshold value, calculates the frequency of a bright portion and the frequency of a dark portion. The image quality priority setting unit 502 sets the priority of the image quality.

In the first embodiment, by the camera control unit 106 changing the reference luminance and the exposure correction amount, there are cases where the gradation of the bright portion or the dark portion is lost.

Figure 6A:
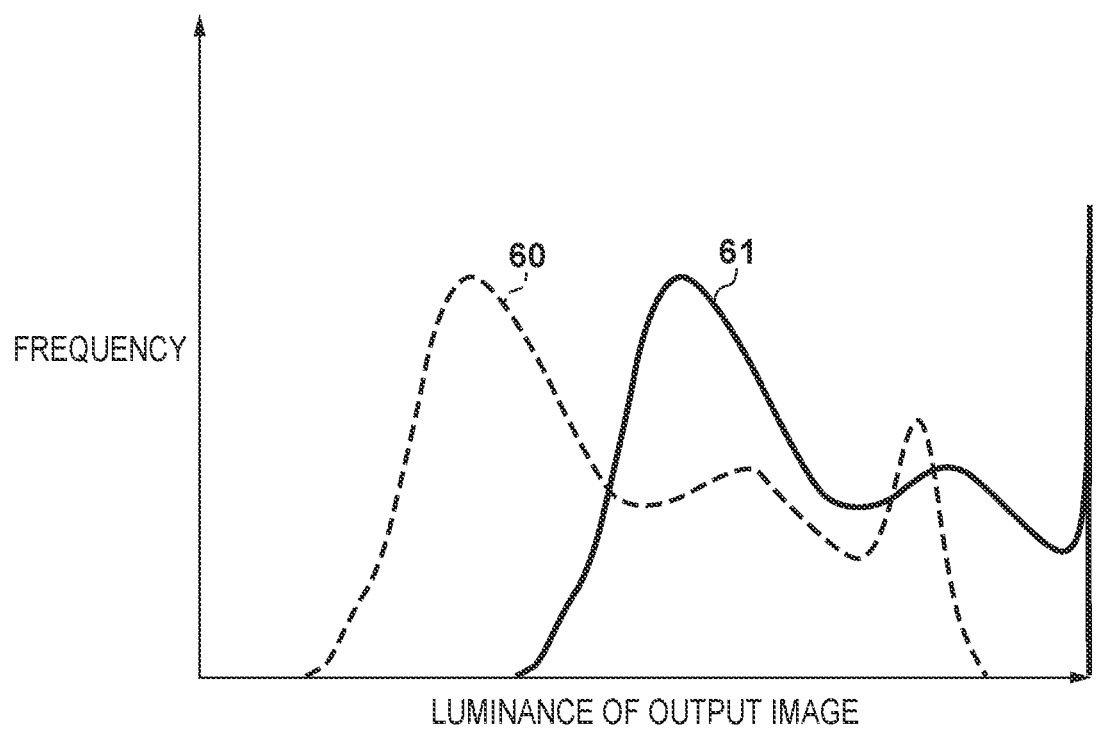
FIGS. 6A and 6B are views illustrating examples of changes in luminance distributions that can occur by the second embodiment.
Figure 6B:
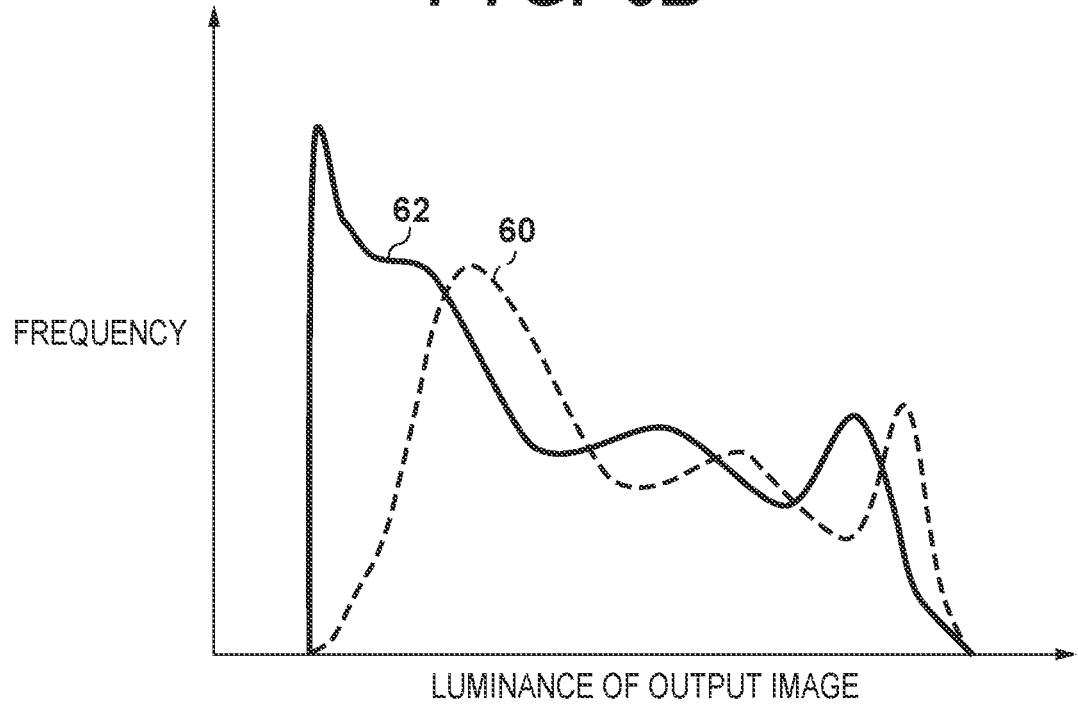

FIG. 6A illustrates an example of a luminance distribution when the gradation of a bright portion is lost, and FIG. 6B illustrates an example of a luminance distribution when the gradation of a dark portion is lost. With respect to a luminance distribution 60 that is subject to a luminance range correction at a predetermined compression ratio, a luminance distribution 61 indicates a case where the gradation of the bright portion is lost as a result of changing the reference luminance, and the luminance distribution 62 indicates a case where the gradation of the dark portion is lost as a result of changing the exposure correction amount.

Therefore, in the second embodiment, when the camera control unit 106 changes the reference luminance and the exposure correction amount, ranges in which the reference luminance and the exposure correction amount change are limited based on a result of analysis by the luminance distribution analysis unit 501.

At this time, the luminance distribution analysis unit 501 divides the luminance distribution of the output image of the image processing unit 103 into a high luminance region, a medium luminance region, and a low luminance region according to a first threshold value and a second threshold value. When a total luminance frequency of the high luminance region is equal to or greater than a third threshold value (equal to or greater than a first predetermined value), the compression ratio may be reduced without changing the reference luminance and the exposure correction amount so that the output image of the luminance range correction unit 105 becomes brighter.

When a total luminance frequency of the low luminance region is equal to or greater than a fourth threshold value (equal to or greater than a second predetermined value), the compression ratio may be reduced without changing the reference luminance and the exposure correction amount so that the output image of the luminance range correction unit 105 becomes darker.

In addition, there are cases where the priorities of image quality and coding efficiency change due to a restriction such as the capacity of the recording medium and the bandwidth limitation of a network that reaches the recording medium. Therefore, in the second embodiment, there is a configuration in which the priority of the image quality and the coding efficiency can be changed by the image quality priority setting unit 502. At this time, configuration may be taken such that the image quality priority can be set to an arbitrary value in accordance with an operation unit (not illustrated), or is received from an external apparatus and adaptively set.

When the image quality priority is set to be lower than a predetermined reference value by the image quality priority setting unit 502, the camera control unit 106 performs at least one of an increase in the compression ratio and a decrease in the amplification factor. At this time, since the luminance of the image decreases due to the decrease in the amplification factor, the reference luminance may be increased.

As described above, in the present embodiment, it is possible to control the image quality and the coding efficiency based on the priority of the image quality by suppressing a loss of the gradation of a bright portion and a dark portion that may occur in the first embodiment.

Other Embodiments

Embodiment(s) of the present invention can also be realized by a computer of a system or apparatus that reads out and executes computer executable instructions (e.g., one or more programs) recorded on a storage medium (which may also be referred to more fully as a non-transitory computer-readable storage medium) to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-027652, filed on Feb. 19, 2019, which is hereby incorporated by reference herein in its entirety.

What is claimed is:
1. An image capturing apparatus, comprising:
an image capturing device configured to capture a subject image; and
at least one processor or circuit configured to function as:
a range correction unit configured to perform a range correction for compressing a range of luminance in an image signal captured by the image capturing device;
a calculation unit configured to calculate a luminance change amount between a luminance value of the captured image on which the range correction is not performed and a luminance value of the compressed image on which the range correction is performed; and
a determination unit configured to determine an exposure amount at a time of capturing by the image capturing device such that the luminance change amount is reduced.

2. The image capturing apparatus according to claim 1, wherein the at least one processor or circuit is configured to further function as
an estimation unit configured to estimate an amount of noise contained in the image signal, and
wherein the larger the amount of noise is estimated by the estimation unit, the more the range correction unit reduces a difference between a maximum output value and minimum output value in the input/output characteristic in a case of performing the range correction on the image signal.

3. The image capturing apparatus according to claim 1, wherein the at least one processor or circuit is configured to further function as:
a recording device configured to record a luminance distribution or a statistic of an image signal before the range correction is performed, and
wherein the identification unit identifies the luminance change amount based on a luminance distribution or a statistic of the image signal after performing the range correction and the luminance distribution or the statistic recorded in the recording device.

4. The image capturing apparatus according to claim 1, wherein when it is identified by the identification unit that the luminance of the image signal has increased due to the range correction, the changing unit changes the exposure amount so as to reduce the luminance of the image signal.

5. The image capturing apparatus according to claim 1, wherein when it is identified by the identification unit that the luminance of the image signal has decreased due to the range correction, the changing unit changes the reference luminance value so as to increase the luminance of the image signal.

6. The image capturing apparatus according to claim 1, wherein the at least one processor or circuit is configured to further function as
a setting unit configured to set an image quality priority of the image signal, and
wherein the changing unit changes the exposure amount based on the image quality priority.

7. The image capturing apparatus according to claim 1, wherein the at least one processor or circuit is configured to further function as
a determination unit configured to determine whether a frequency of a bright portion of the image signal before the range correction is performed is equal to or greater than a first predetermined value, and
wherein, in a case where it is determined that the frequency of the bright portion is equal to or greater than the first predetermined value, a change of the exposure amount by the changing unit is limited.

8. The image capturing apparatus according to claim 1, wherein the at least one processor or circuit is configured to further function as
a determination unit configured to determine whether a frequency of a dark portion of the image signal before the range correction is performed is equal to or greater than a second predetermined value, and
wherein, in a case where it is determined that the frequency of the dark portion is equal to or greater than the second predetermined value, a change of the exposure amount by the changing unit is limited.

9. A method for controlling an image capturing apparatus comprising an image capturing device operable to capture a subject image, the method comprising:
performing a range correction for compressing a range of luminance in an image signal captured by the image capturing device;
calculating a luminance change amount between a luminance value of the captured image on which the range correction is not performed and a luminance value of the compressed image on which the range correction is performed; and
determining and exposure amount at a time of capturing by the image capturing device such that the luminance change among is reduced.

10. A non-transitory computer-readable storage medium storing a program for causing a computer to execute respective steps of a method of controlling an image capturing apparatus including an image capturing device operable to capture a subject image, the method comprising:
performing a range correction for compressing a range of luminance in an image signal captured by the image capturing device;
calculating a luminance change amount between a luminance value of the captured image on which the range correction is not performed and a luminance value of the compressed image on which the range correction is not performed; and
determining an exposure amount at a time of capturing by the image capturing device such that the luminance change amount is reduced.

* * * * *